(12) United States Patent  
Purdum et al.

(10) Patent No.: US 7,688,473 B2
(45) Date of Patent: Mar. 30, 2010

(54) TINTED EDGE ENHANCEMENT USING HARMONIC HALFTONES FOR THE BOUNDARY PIXELS

(75) Inventors: Connie F. Purdum, Rochester, NY (US); Robert P. Loce, Webster, NY (US); Beilei Xu, Penfield, NY (US); David J. Lieberman, Fairport, NY (US); Mark A. Gwaltney, Fairport, NY (US); Jon S. McElvain, Manhattan Beach, CA (US); Charles M. Hains, Altadena, CA (US)

(73) Assignee: Xerox Corporation, Norwalk, CT (US)

( * ) Notice: Subject to any disclaimer, the term of this patent is extended or adjusted under 35 U.S.C. 154(b) by 1170 days.

(21) Appl. No.: 10/973,725

(22) Filed: Oct. 26, 2004

(65) Prior Publication Data

US 2006/0087694 A1    Apr. 27, 2006

(51) Int. Cl.
*H04N 1/409* (2006.01)
(52) U.S. Cl. .................. 358/3.2; 358/533; 358/3.06; 358/536; 382/263; 382/264; 382/266; 382/268; 382/269
(58) Field of Classification Search ................ 358/298, 358/1.9, 533, 3.06, 462, 536, 3.2, 1.1; 382/173, 382/263, 264, 266, 268, 269
See application file for complete search history.

(56) References Cited

U.S. PATENT DOCUMENTS 4,965,599 A * 10/1990 Roddy et al. ............... 347/240

(Continued)

FOREIGN PATENT DOCUMENTS

EP    0674289 B1 *  3/2000

OTHER PUBLICATIONS

Dr. Weinrich Wadle, "An Introduction to Screening Technology", May 2002, Heidelberger Druckmaschinen AG, pp. 9 and 25.*

(Continued)

*Primary Examiner*—King Y Poon
*Assistant Examiner*—Jamares Washington
(74) *Attorney, Agent, or Firm*—Philip E. Blair; Fleit Gibbons Gutman Bongini & Bianco P.L.

(57) ABSTRACT

Disclosed herein is an image processing method for producing enhanced halftone edges, particularly suited to those edges which only lie upon the background as apposed to those edges which abut other halftone screens. It utilizes a step of defining border pixels and a step of halftoning those border pixels in a different manner than the halftoning applied to the interior region of the tint or image segment. The preferred halftone for the border pixels will be related to the interior halftone by some number of common spatial frequency harmonics. Examples of common-harmonic screening for an edge include, but are not limited to: (a) same screen with different tone reproduction characteristics (boosted edge values); (b) same screen angles and frequencies with a different spot function, possibly phase shifted; (c) a dot screen whose frequency vectors can be generated by the frequency vectors of the interior screen; (d) a line screen whose frequency vectors can be generated by the frequency vectors of the interior screen. This generation process is directed to ensuring that the two screens will be "harmonically matched" where at least one of the fundamental frequency vectors and harmonics of the first screen will equal at least one of the fundamental frequency vectors and harmonics of the second screen.

20 Claims, 7 Drawing Sheets

U.S. PATENT DOCUMENTS

| | | | |
|---|---|---|---|
| 5,155,599 A * | 10/1992 | Delabastita | 358/3.07 |
| 5,471,543 A * | 11/1995 | Ng et al. | 382/173 |
| 5,898,822 A | 4/1999 | Holladay | 395/109 |
| 6,081,345 A * | 6/2000 | Curry | 358/3.28 |
| 6,243,499 B1 * | 6/2001 | Loce et al. | 382/269 |
| 6,252,675 B1 * | 6/2001 | Jacobs | 358/1.9 |
| 6,798,539 B1 * | 9/2004 | Wang et al. | 358/1.9 |
| 6,956,670 B1 * | 10/2005 | Dittrich et al. | 358/1.9 |
| 7,274,492 B1 * | 9/2007 | Hains et al. | 358/3.23 |
| 2003/0058474 A1 | 3/2003 | Loce et al. | 358/2.1 |
| 2004/0085557 A1 | 5/2004 | Loce et al. | 358/1.9 |

OTHER PUBLICATIONS

Robert P. Loce et al., U.S. Appl. No. 10/909,627, filed Aug. 2, 2004, entitled "Method for Minimizing Boundary Defects Using Halftone Classes With Matched Harmonics".

* cited by examiner

TINTED EDGE ENHANCEMENT USING HARMONIC HALFTONES FOR THE BOUNDARY PIXELS

CROSS-REFERENCE TO RELATED APPLICATIONS

Cross reference is made to the following applications, the disclosures of each of which are totally incorporated by reference herein: U.S. patent application Ser. No. 10/909,627, entitled "METHOD FOR MINIMIZING BOUNDARY DEFECTS USING HALFTONE CLASSES WITH MATCHED HARMONICS" to Inventors Robert P. Loce, Charles M. Hains, Beilei Xu, Connie F. Purdum, and Xiaoxue (Shirley) Cheng. The appropriate components and processes of the above co-pending application may be selected for the invention of the present application in embodiments thereof.

BACKGROUND AND SUMMARY

This disclosure relates generally to halftoning methods, and more particularly to a halftoning method for producing halftone screens with improved boundary appearance.

In object oriented halftoning, a different halftone screen is assigned to different object types. For example, text objects can be halftoned using a halftone screen which is optimized for text objects; background objects can be halftoned using a halftone screen which is optimized for background objects. Object oriented halftoning has been a long standing attractive idea with the long standing problem of the ragged appearance of the boundaries between adjacent halftones. During object oriented halftoning artifacts are created at the boundaries between two halftone screens. These artifacts give the appearance of ragged edges at boundaries of the printed objects.

The technical reason for edge artifacts is generally related to the different frequency vectors of the adjacent halftone screens.

Some production printers possess the capability to switch halftones on a pixel boundary. Consider an exemplary printer that can use several different halftones that can be switched on a pixel boundary. For printers with this capability, it can be desirable to utilize very low frequency halftones as a solution for achieving a high degree of uniformity in broad tinted areas. A medium frequency halftone can be preferred for image content with a medium degree of edge content. A high frequency screen can be desirable for rendering objects with sharp edges so those edges can be well defined. While the particular halftones may be optimal for a given object type, when different objects are adjacent, such as text on a tinted background, the appearance of the boundary can exhibit the raggedness artifact.

U.S. Pat. No. 5,898,822 to Thomas Holladay for "Using the Phase Information in the Halftone Dot Structure to Minimize Artifacts when Switching Between Halftone Dots on a Scan Line" describes a method of reducing visible image artifacts that uses variable phase parameters (i.e., the standard x, y start position in halftone cells) during halftoning processes to match the phase of halftone cells and also uses a brick approach to halftoning. In Holladay, the position in a halftone dot structure is correlated to the phase of sine waves for subsequent dots to be used in a halftoning process. This method provides some beneficial properties to minimizing image artifacts caused by phase parameters, but it does not address all artifacts, such as the beating artifact at the boundary between objects that occurs in print engines which use low frequency halftone screens, that may result in printers that utilize object oriented halftone printing by adjacent halftone screens.

U.S. patent application Ser. No. 10/909,627, discloses that a method for minimizing boundary effects when switching between halftone screens on a scanline, includes selecting a first halftone screen having a first fundamental frequency and a first angle for printing pixels of a first type; and selecting a second halftone screen having a second fundamental frequency and a second angle for printing pixels of a second type, wherein the second frequency and second angle are harmonically matched to the first frequency and first angle, wherein at least one pixel of the second type is adjacent to a pixel of the first type. In one embodiment, the first and second frequencies are selected to have a substantially zero frequency beat. In another, the first and second frequencies are selected to have a substantially high frequency beat. As such the application addresses those situations of ragged edges where adjacent halftone screens abut. However, this U.S. application Ser. No. 10/909,627, fails to address the situation of ragged edges which only lie upon untoned background such as for the most common example, the white background of a sheet of paper. U.S. application Ser. No. 10/909,627 teaches use of harmonically related screens that produce smooth transitions between two tinted objects. What is needed is a methodology which will handle the edges of tints that may lie on a white background providing them with smooth edges.

Disclosed in embodiments herein is an image processing method for producing image objects with enhanced halftone edges. The method comprises defining border pixels of an image object, selecting a first halftone screen having a first fundamental frequency and a first angle for printing the image object; and selecting a second halftone screen having a second fundamental frequency and a second angle for printing the defined border pixels, wherein the second frequency and second angle are harmonically matched to the first frequency and first angle.

Further disclosed in embodiments herein is a method for minimizing boundary effects by producing enhanced edges for image objects. The method comprises defining border pixels of an image object. The method further comprises selecting a first halftone screen having a first fundamental frequency and a first angle for printing pixels of a first object type for rendering the image object, and selecting a second halftone screen having a second fundamental frequency and a second angle for printing pixels of a second object type for rendering the defined border pixels, wherein the second frequency and second angle are harmonically matched to the first frequency and the first angle.

Further disclosed in embodiments herein is an image processing method for producing image segments with enhanced halftone edges. The method comprises defining border pixels of an image segment; selecting a first halftone screen having a first fundamental frequency and a first angle for rendering the image segment; and selecting a second halftone screen having a second fundamental frequency and a second angle for rendering the defined border pixels, wherein the second frequency and second angle are harmonically matched to the first frequency and first angle.

DETAILED DESCRIPTION

For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. An "image", as a pattern of physical light or a collection of data representing said physical light, may include characters, words, and text as well as other features such as graphics. A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably. In the event that one term or the other is deemed to be narrower or broader than the other, the teaching as provided herein and claimed below is directed to the more broadly determined definitional term, unless that term is otherwise specifically limited within the claim itself.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. Although described herein as continuous tone processing, the present invention applies equally as well to the processing of color images, wherein each separation is treated, effectively, as a gray scale or continuous tone image. Accordingly, references herein to the processing of continuous tone (contone) or gray scale images is intended to include the processing of color image separations as well. An operation performs "image processing" when it operates on an item of data that relates to part of an image.

Disclosed herein is an image processing method for producing enhanced halftone edges, particularly suited to those edges which only lie upon the background as apposed to those edges which abut other halftone screens. It utilizes a step of defining border pixels and a step of halftoning those border pixels in a different manner than the halftoning applied to the interior region of the tint or image segment. The preferred halftone for the border pixels will be related to the interior halftone by some number of common spatial frequency harmonics. Examples of common-harmonic screening for an edge include, but are not limited to: (a) same screen with different tone reproduction characteristics (boosted edge values); (b) same screen angles and frequencies with a different spot function, possibly phase shifted; (c) a dot screen whose frequency vectors can be generated by the frequency vectors of the interior screen; (d) a line screen whose frequency vectors can be generated by the frequency vectors of the interior screen. By "generated" it is meant that the frequency vectors of a second screen can be formed by vector addition of the frequency vectors of a first screen, where the vectors can be added with integer coefficients. This generation process ensures that the two screens will be "harmonically matched" where the term harmonically matched refers to at least one of the fundamental frequency vectors and harmonics of the first screen will equal at least one of the fundamental frequency vectors and harmonics of the second screen.

Figure 1A:
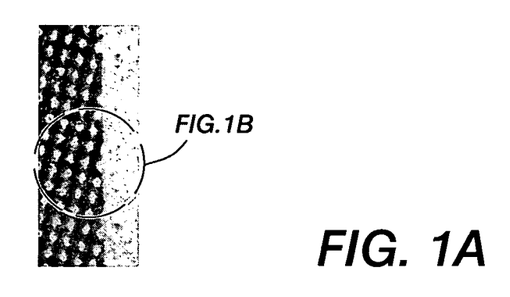
FIG. 1A is a photomicrograph of a print from an offset printer.
Figure 1B:
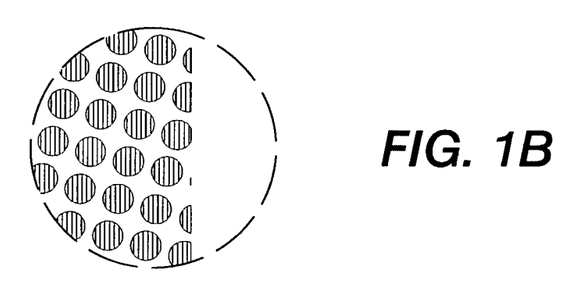
FIG. 1B is a blow-up of the circled area in FIG. 1A.
Figure 2A:
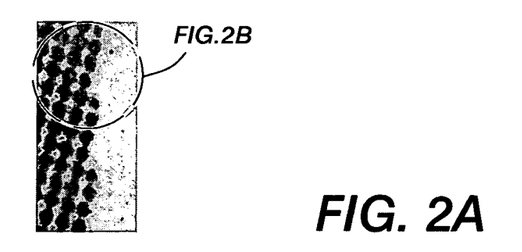
FIG. 2A is a photomicrograph of a print from a electrophotographic digital printer.
Figure 2B:
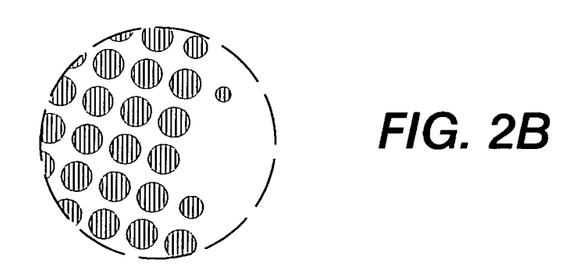
FIG. 2B is a blow-up of the circled area in FIG. 2A.

FIG. 1A is a photomicrograph of a print from an offset printer depicting a printed edge. FIG. 1B is a schematical blow-up of the circled area in FIG. 1A and depicts in greater clarity the pixels of FIG. 1A. As can be seen by FIGS. 1A and 1B the edge rendering as provided by an offset printer achieves a very clean cut edge. FIG. 2A is a photomicrograph of a print from an electro-photographic digital printer. FIG. 2B is a blow-up of the circled area in FIG. 2A. Here the rendered edge is not only less clean but halftone dots that are split by the edge may print proportionally too small or too large, with respect to an un-split dot, depending upon the physical conditions of the marking process, thus effecting a ragged appearance.

The method for producing enhanced halftone edges as taught herein has two key steps: first, is the defining of border pixels; second, is the halftoning of those defined border pixels in a manner different than the halftoning applied to the interior region of the tint or image segment, preferably using a halftone that has harmonics in common with the halftone of the interior pixels. These steps can be performed in a DFE (Digital Front End), a print engine, or some other computational device. Furthermore the two steps may be performed within different portions of a given image path. Which pixels are defined as border pixels is communicated to the halftone processor via tags, or in one alternative the border defining step and halftoning are integrated into one module.

Border pixels can be defined as pixels just inside of the edge of an image object (inside border pixels), pixels just outside the edge of an image object (outside border pixels), or both inside and outside border pixels. There are a variety of methods in the field of image processing that allow a user to define border pixels. One embodiment uses a method based on Boolean logic or Look-Up Tables (LUTs) due to their straightforward implementation in a real-time image path. However, other methods, such as linear-filtering-based edge detection may also be used.

One example embodiment defines an observation window that is large enough (e.g., 7×7) to allow the recognition of 1, 2, or 3 pixel width borders. The methodology may employ inside border pixels, but in an alternative may also employ some combination of pixels inside and outside border. The specific logic that processes the pixels in the observation window is in one embodiment designed to have a downloadable architecture so that these border characteristics may be subsequently further custom optimized at a later time. One preferred Boolean logic architecture for identifying border pixels is based on a morphological "top hat transform." Top hat transforms identify inside border pixels by eroding an image with a structuring element, then subtracting the erosion result from the original image. Outside border pixels may be defined by dilating an image with a structuring element, then subtracting the original image from the dilation result. Specific shape characteristics of the border thus defined may be tuned by adjusting the structuring elements. As will be apparent to one skilled in the art, combinations of inside and outside border pixels can be formed by combining the two types of transforms. Pixels that are identified as border pixels can be input directly into an "outline halftone process" or the alternative those pixels may be tagged and processed in some later stage.

In rendering the border pixels it is preferred to use a halftone that is related to the interior halftone by some number of common spatial frequency harmonics. A halftone that is related by common harmonics will avoid the undesirable phenomenon of beats between halftones, which would result in a lower frequency "beaded" appearance at the edge. Examples of common-harmonic screening for an edge may include, but are not limited to, (1) the same screen with different tone reproduction characteristics, (2) the same screen angles and frequencies with a different spot function, possibly phase shifted, (3) a dot screen whose frequency vectors can be generated by the frequency vectors of the interior screen, (4) a line screen whose frequency vectors can be generated by the frequency vectors of the interior screen. It should be noted that for any of the harmonically related screens the phase and amplitude of the edge halftones are parameters that can be optimized for a given marking process and edge orientation (position and angle). Additional insight in harmonically related halftones maybe be found in U.S. application Ser. No. 10/909,627 incorporated by reference above. Examples of rendering edge borders with common harmonic screens are shown in FIGS. 3, 4, 7, 9, 11 & 12.

Figure 3:
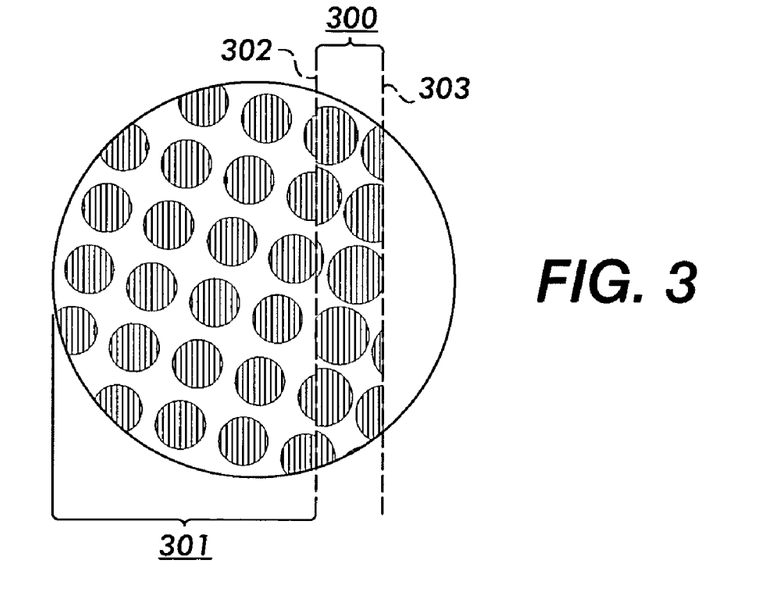
FIG. 3 schematic of harmonically related halftones applied to the image border as per the disclosure where the same angles and frequencies as the body are employed in the border but with a boosted signal.

As depicted in FIG. 3 there is shown a pixel border 300 provided for segment 301 as is delineated by lines 302 and 303. In the example shown in FIG. 3, the contone level for the edge border pixels 300 is boosted by some predetermined amount, resulting in a dilation of the halftone dots. By using the existing (interior) halftone, the beating of two different halftones is avoided while enabling partial compensation for the dot erosion/deletion at the edges, thereby producing sharper tinted fonts and line-art. Similar to existing CRM (Contone Rendering Module) outlining methods, selection of the boost levels is a delicate tradeoff. Boosting that is too conservative results in excessive edge dot erosion, and overly aggressive boosting gives rise to objectionably dark outlines at the segment edges. The compensation (boost) level can be empirically determined from calibration prints that are visually inspected for quality and subsequently implemented in a lookup table (LUT). The boost levels will in general be a function of the original edge levels and surrounding contone levels. The boost level can be separation independent utilizing a 1-dimensional TRC (Tone reproduction Curve) for each color separation, for example four TRCs for conventional cyan, magenta, yellow, black printing. Or in but one possible alternative, the boost levels can involve utilization of cross-separation terms such as with four, 4-Dimensional-to-1-Dimensional lookup tables for color-separation printing.

The boosting method has the particular advantage of versatility, since it is TRC driven—the boost TRC's can be computed off line. Another advantage is separate boost TRC's can be constructed for each halftone. This is important since edge xerographics can be highly dependent on the halftone frequency and angle, and thus provide different edge erosion characteristics. One exemplary approach uses a single edge boost TRC for each separation (for each halftone), with the edge compensation applied only for tinted text/line-art segments that get overlaid against a white background. In an experiment using this method with the appropriate boost TRC chosen, the text/line sharpness rivaled an existing CRM outlining algorithm, and in some cases exceeded it.

Another class of edge screens useful in addressing the present problem utilizes frequency components that are rotated or flipped about an axis. For example, when using a 170 cpi 15° interior screen, an edge screen rotated by 45° may be beneficial, such as a 240 cpi 60° screen. There is some potential for image quality improvement based on this teaching in combination with US 2003/0058474 where screens used at two different orientations were found to solve a different halftone jaggy problem.

Figure 4:
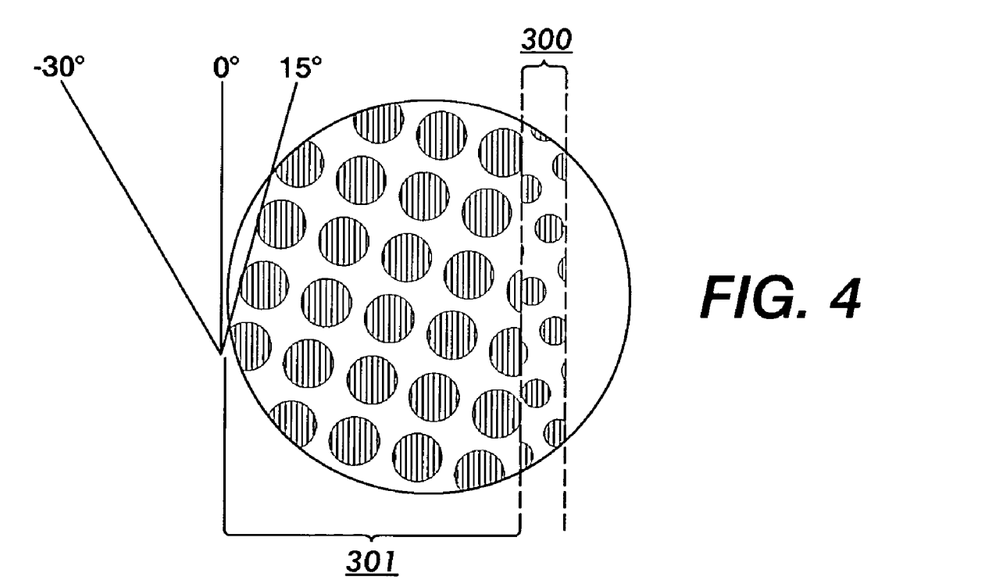
FIG. 4 schematic of harmonically related halftones applied to the image border as per the disclosure where the angles and frequencies employed in the border are rotated 45°, frequency increased by √2.
Figure 5:
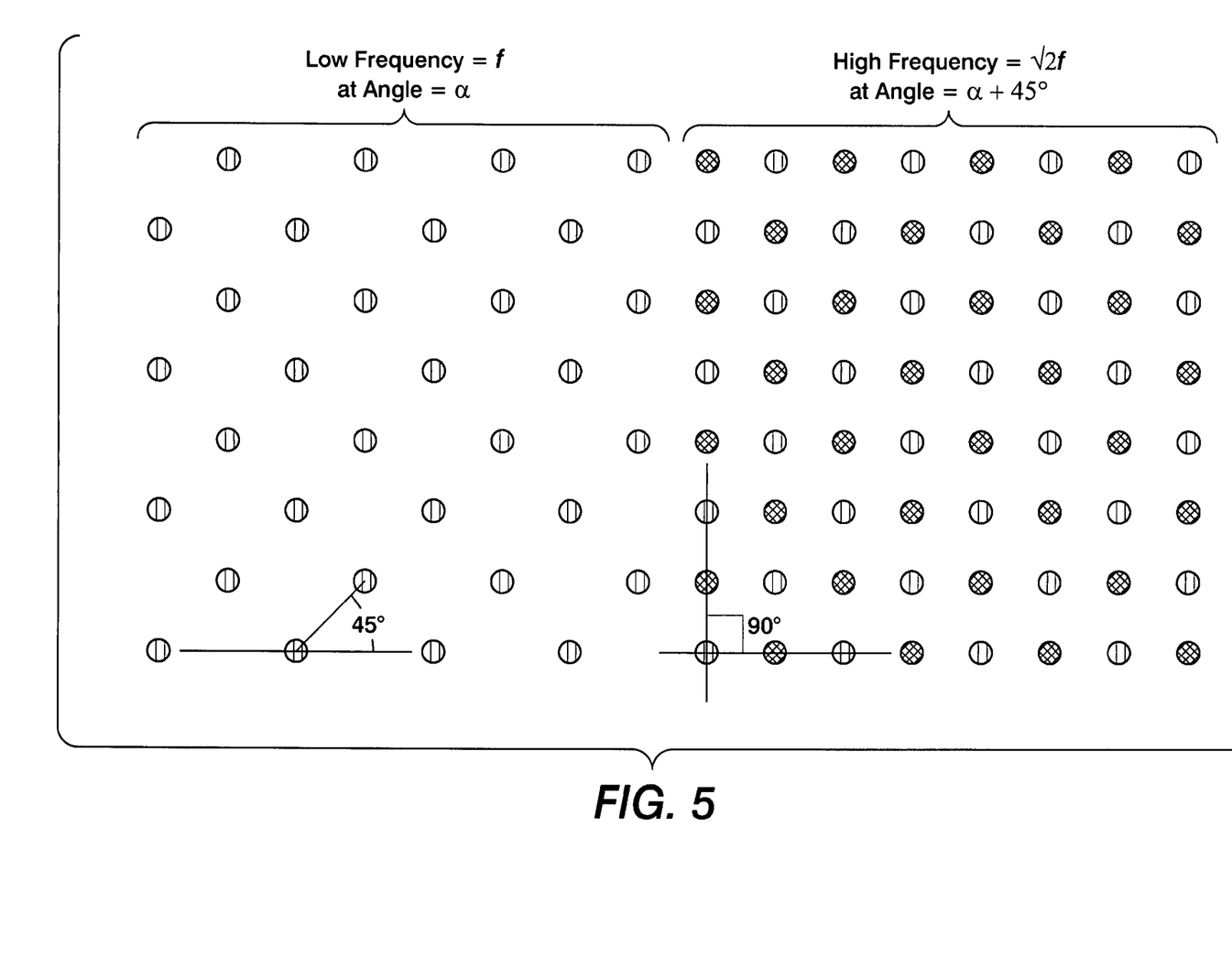
FIG. 5 is a schematic of a low frequency dot screen and a high frequency dot screen that share harmonics.
Figure 6:
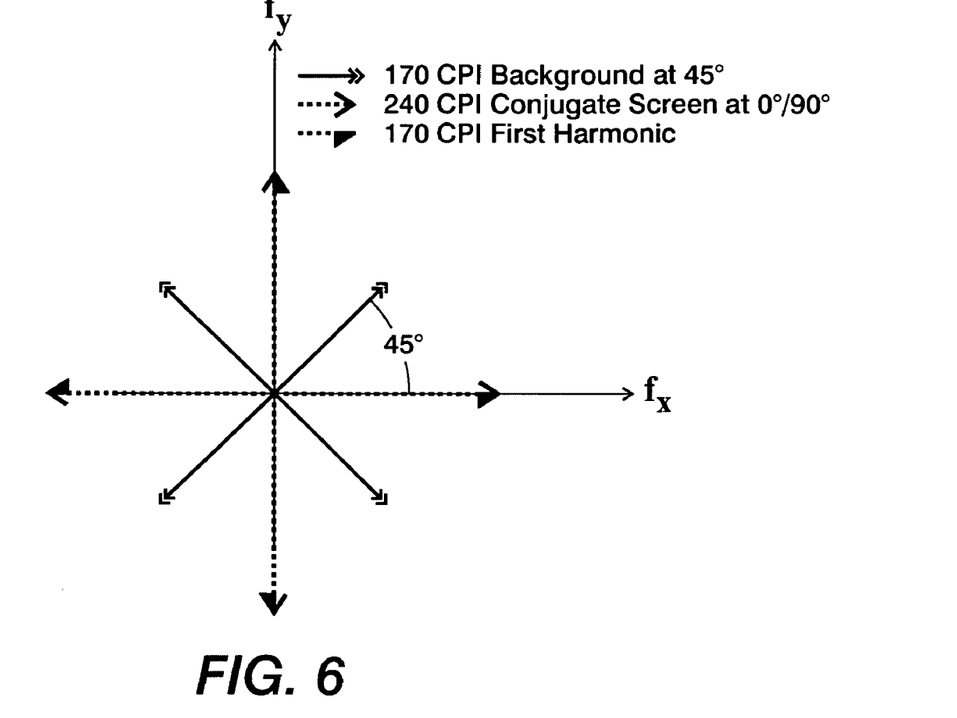
FIG. 6 illustrates a frequency vector diagram of the halftone screens used in FIG. 5.

FIG. 4 depicts an example of harmonically related halftones applied to the image segment pixel border 300 where the angles and frequencies employed in the border 300 are rotated 45°, and the frequency increased by the square root of two ($\sqrt{2}$). In FIG. 5, a schematic of a dot screen pair as provided for FIG. 4 is illustrated. In FIG. 5, the low frequency dot screen has a frequency f and an angle $\alpha$. The high frequency dot screen has a frequency $\sqrt{2} \times f$, and an angle of theta plus 45 degrees ($\alpha+45°$). The fundamental frequency of the low frequency screen is shown as dark circles. In the high frequency screen those same dots are shown with additional dots placed midway between the dark dots. The two screens have common frequency components, i.e., matched harmonics. As will be appreciated by those skilled in the art, the edge quality is thus improved with the halftone provided in FIGS. 4 and 5, especially for lighter text, compared to the image rendered using non-harmonically related halftones. The frequency vector diagram for this configuration is shown in FIG. 6. FIG. 6 shows that the fundamental frequency of the high frequency screen is the same as the first harmonic of the low frequency screen, with the fundamental low frequency being displaced 45° from the first harmonic.

Figure 7:
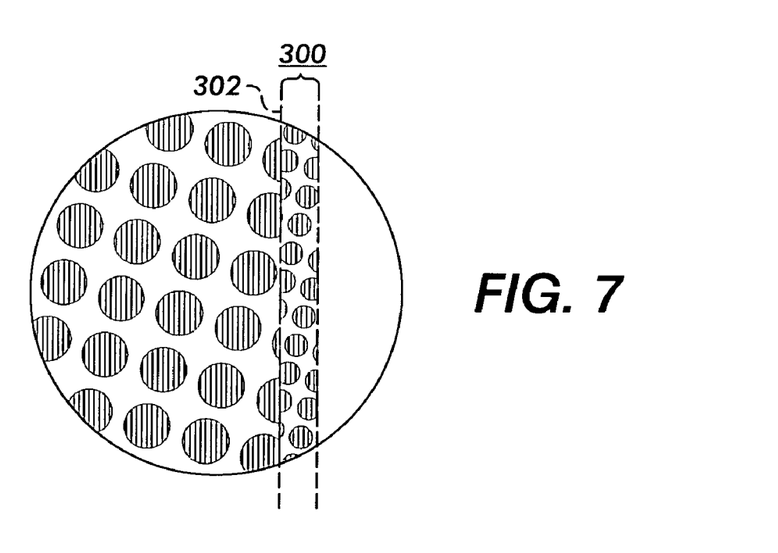
FIG. 7 schematic of harmonically related halftones applied to the image border as per the disclosure where the angles and frequencies employed in the border are frequency doubled.
Figure 8:
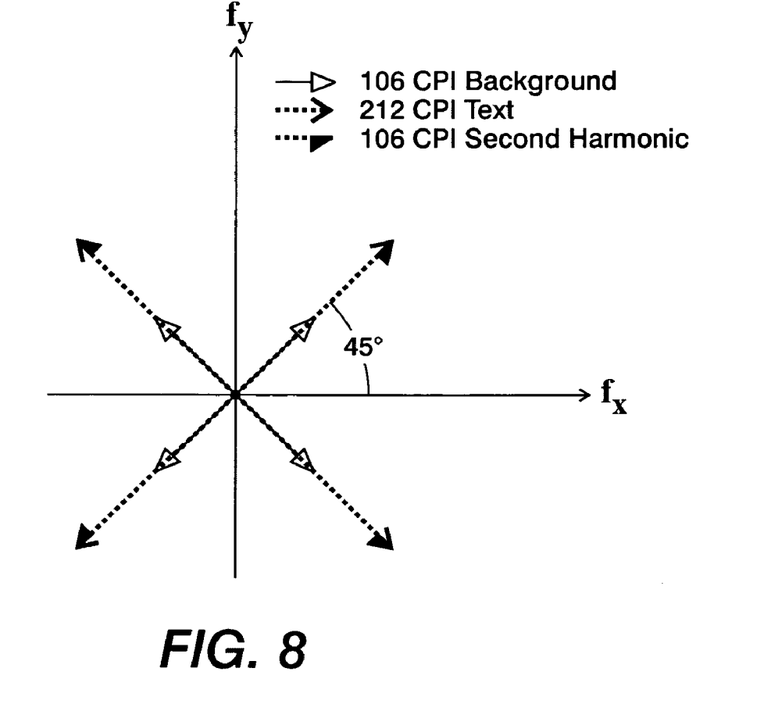
FIG. 8 illustrates a frequency vector diagram of the halftone screens used in FIG. 7.

FIG. 7 schematic of harmonically related halftones applied to the image border 300 as per the disclosure where the angles and frequencies employed in the border 300 are frequency doubled. The segment 301 and border 300 employ using two halftone screens with matched harmonics in which the fundamental halftone frequencies of the adjacent halftone dot screens have an integer multiple frequency relationship and the same phase angles. In the image in FIG. 7, the border 300 is printed using a dot screen having a fundamental frequency of 212 cpi and angle of 45°. (Note that cpi is defined as cycles per inch. This could be used as a measure of frequency for line screens or dot screens, but is typically limited in use to dot screens.) The segment 301 is printed using a dot screen having a fundamental frequency of 106 cpi and angle of 45°. The harmonics of the screens are matched, and thus do not produce objectionable beats at their boundary 302. Note that the frequency of the border halftone screen 300 is 2 times the frequency of the segment halftone screen 301. FIG. 8 diagrams how the fundamental frequency vectors for the 212 cpi border at 45° are matched to second harmonics of the 106 cpi segment.

Figure 9:
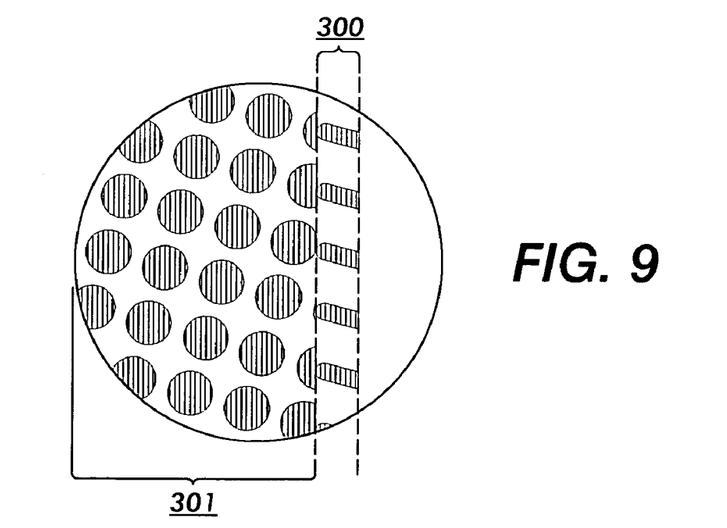
FIG. 9 schematic of harmonically related halftones applied to the image border as per the disclosure where the angles and frequencies employed in the border are a line screen aligned with one frequency vector.
Figure 10:
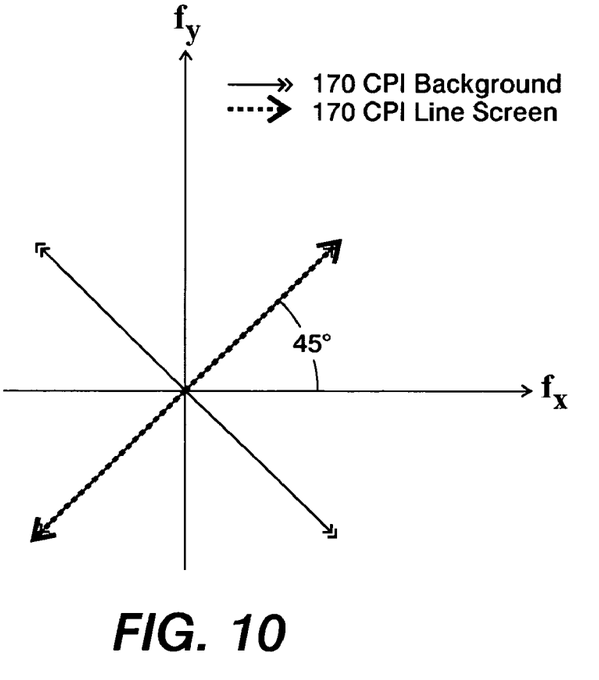
FIG. 10 illustrates a frequency vector diagram for halftone screens used in FIG. 9.
Figure 11:
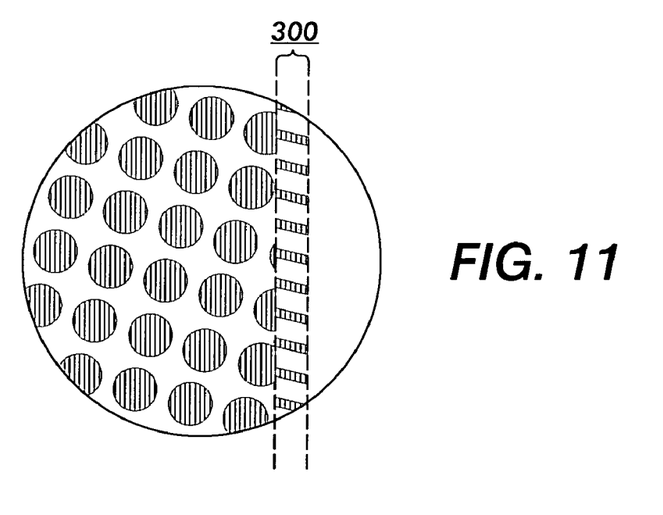
FIG. 11 schematic of harmonically related halftones applied to the image border as per the disclosure where the angles and frequencies employed in the border are a double frequency line screen.

FIG. 9 schematic of harmonically related halftones applied to the image border as per the disclosure where the angles and frequencies employed in the border area 300 are a line screen aligned with one frequency vector of the halftone in segment 301. The rendering as embodied here is with a dot screen having a fundamental frequency of 170 cpi and angle of 45° for the segment 301 and 170 lpi at 1350 line screen for the border 300. (Note that lpi means lines per inch. Although some experts in the field of halftoning use these units for a measure of frequency for either line screens or dot screens, its use is limited herein to line screens for clarity of discussion.) FIG. 10 shows the frequency vector diagram for this configuration with the 170 lpi line screen aligned with one axis of the 170 cpi halftone at 45°. Further, it may be desirable that line screen type for the border area 300 to be at a higher frequency multiple than the dot screen. FIG. 11 provides depiction of harmonically related halftones applied to the image border as per the disclosure above where the angles and frequencies employed in the border are at 2× or a double frequency line screen.

Figure 12:
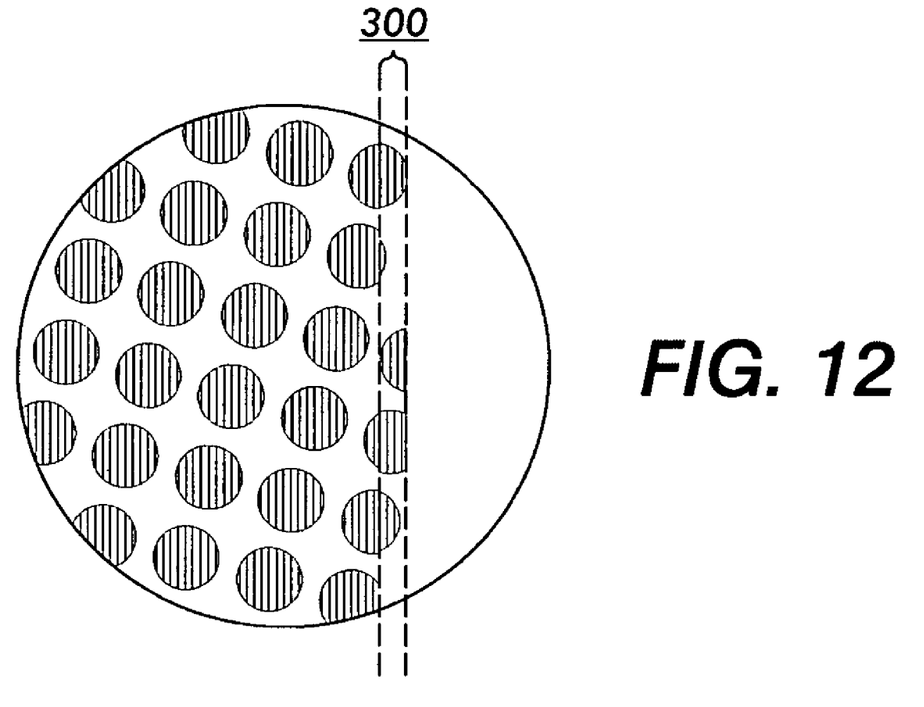
FIG. 12 schematic of harmonically related halftones applied to the image border as per the disclosure where the same angles and frequencies as the body are employed in the border but with a variably boosted signal.

FIG. 12 shows a more sophisticated edge boosting method. This approach is similar to the method illustrated in FIG. 3, except that the boost level adapts to the nonlinear compensation required for different shape and size partial-dots. Any dot cluster (or hole) that crosses an edge exhibits a clipped rendition. The xerographic response to this clipped (partial) dot is highly engine dependent. For example, an engine that fails to develop small partial dots but develops completed clusters on the edge may exaggerate jaggy artifacts. To compensate for this effect, a tone dependent and partial-dot dependent adjustment is provided. As an example, four dot clusters on the edge have been clipped in FIG. 12. From top to bottom, one cluster is provided a moderate edge boost, the next is clipped, and the next receives a significant boost, while the last receives a small boost. In each case, the objective is to offset the xerographic response to a variety of different shaped partial-dots. In general, this type of compensation is engine dependent, and depends upon the tone level on both sides of the edge, the halftone frequency and angle, and the level of partial dotting evident at the edge (which depends on the location of the dot clusters and holes relative to the edge).

Additional considerations. The above discussion assumed orthogonal halftone screens because it was simpler to describe the concepts using the assumption that the fundamental frequencies of a dot screen were the same in both directions and the angles between those frequencies were related by 90°. Some halftone screens are constructed based on non-orthogonal cells. The concept of the desirability of matched harmonics still applies. The only difference is that the design must account for the different frequency vectors, and not assume they are the same in both directions.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An image processing method for producing image objects with enhanced halftone edges comprising:
    defining, with a computational device, a pixel border region and an interior region within an image object, the image object initially having a first halftone screen having a first fundamental frequency and a first angle,
        the pixel border region comprising border pixels adjacent to an edge of the image object,
        the interior region being adjacent to and separate from the pixel border region,
        the edge of the image object abutting an untoned background, and
        wherein the pixel border region comprises a portion lying between the interior region and the untoned background;
    printing pixels within the interior region using the first halftone screen; and
    selecting, with the computational device, a second halftone screen having a second fundamental frequency and a second angle for printing pixels within the pixel border region,
    the second halftone screen selected to have a boosted contone level relative to the first halftone screen wherein the second frequency and second angle are harmonically matched to the first frequency and first angle, and wherein the boosted contone level is determined based upon values stored in at least one pre-defined lookup table that are associated with a combination of contone levels in the interior region and upon contone levels in the pixel border region.

2. The method of claim 1, wherein the first and second halftone screens comprise dot screens and wherein the first and second angles are rotated 45° from one another and the first fundamental frequency is an integer multiple of a square root of 2 and the second fundamental frequency.

3. The method of claim 1, wherein the first halftone screen comprises a dot screen and the second halftone screen comprises a line screen; wherein the first and second angles are substantially the same; and wherein the first fundamental frequency is an integer multiple of the second fundamental frequency.

4. The method of claim 1, wherein the first halftone screen comprises a dot screen and the second halftone screen comprises a line screen and wherein the first and second angles are rotated 45° from one another and the first fundamental frequency is an integer multiple of a square root of 2 and the second fundamental frequency.

5. The method of claim 1, wherein the first and second halftone screens comprise line screens having the same angle and wherein the first fundamental frequency is an integer multiple of the second fundamental frequency.

6. The method of claim 1, wherein the first and second halftone screens comprise line screens and wherein the first and second angles are rotated 90° from one another and wherein the first fundamental frequency is an integer multiple of the second fundamental frequency.

7. The method of claim 1, wherein the first and second halftone screens comprise non-orthogonal cells.

8. A method for minimizing boundary effects by producing enhanced edges for image objects, comprising:
    defining, with a computational device, a pixel border region and an interior region associated with an image object, the pixel border region comprising border pixels adjacent to an edge of the image object and the interior region being adjacent to and separate from the pixel border region;

selecting, with the computational device, a first halftone screen having a first fundamental frequency and a first angle for printing pixels of a first object type for rendering pixels within the interior region; and selecting, with the computational device, a second halftone screen having a boosted contone level relative to the first halftone screen and having a second fundamental frequency and a second angle for printing pixels of a second object type for rendering pixels within the pixel border region, wherein the second frequency and second angle are harmonically matched to the first frequency and the first angle, and wherein the boosted contone level is determined based upon values stored in at least one pre-defined lookup table that are associated with a combination of contone levels in the interior region and upon contone levels in the pixel border region.

9. The method of claim 8, wherein the first and second halftone screens comprise dot screens and wherein the first and second angles are rotated 45° from one another and the first fundamental frequency is an integer multiple of a square root of 2 and the second fundamental frequency.

10. The method of claim 8, wherein the first halftone screen comprises a dot screen and the second halftone screen comprises a line screen; wherein the first and second angles are substantially the same; and wherein the first fundamental frequency is an integer multiple of the second fundamental frequency.

11. The method of claim 8, wherein the first halftone screen comprises a dot screen and the second halftone screen comprises a line screen and wherein the first and second angles are rotated 45° from one another and the first fundamental frequency is an integer multiple of a square root of 2 and the second fundamental frequency.

12. The method of claim 8, wherein the first and second halftone screens comprise line screens having the same angle and wherein the first fundamental frequency is an integer multiple of the second fundamental frequency.

13. The method of claim 8, wherein the first and second halftone screens comprise line screens and wherein the first and second angles are rotated 90° from one another and wherein the first fundamental frequency is an integer multiple of the second fundamental frequency.

14. The method of claim 8, wherein the first and second halftone screens comprise non-orthogonal cells.

15. An image processing method for producing image segments with enhanced halftone edges, the method comprising:

defining, with a computational device, a pixel border region and an interior region associated with an image segment having an initial halftone screen, the pixel border region comprising border pixels adjacent to an edge of the image segment and the interior region being adjacent to and separate from the pixel border region;

selecting, with the computational device, a first halftone screen having a first fundamental frequency and a first angle for rendering pixels within the interior region; and selecting, with the computational device, a second halftone screen having a boosted contone level relative to the first halftone screen and having a second fundamental frequency and a second angle for rendering pixels within the pixel border region, wherein the second frequency and second angle are harmonically matched to the first frequency and first angle, and wherein the boosted contone level is determined based upon values stored in at least one pre-defined lookup table that are associated with a combination of contone levels in the interior region and upon contone levels in the pixel border region.

16. The method of claim 15, wherein the pixel border region is just inside the edge of the image segment.

17. The method of claim 15, wherein the pixel border region is just outside the edge of the image segment.

18. The method of claim 15, wherein the pixel border region is both just inside and just outside the edge of the image segment.

19. The method of claim 15, wherein the edge of the image object abuts an untoned background, and wherein the pixel border region comprises a portion lying between the interior region and the untoned background.

20. The method of claim 15, wherein the selecting the first halftone screen selects the initial halftone screen as the first halftone screen.

* * * * *